United States Patent
Sakata

Patent Number: 5,850,257
Date of Patent: Dec. 15, 1998

[54] NOISE REDUCTION DEVICE EMPLOYING A SAMPLE AND HOLD CIRCUIT, AND AN IMAGE PICKUP DEVICE USING THE NOISE REDUCTION DEVICE

[75] Inventor: Tsuguhide Sakata, Sagamihara, Japan

[73] Assignee: Canon Kabushiki Kaisha, Tokyo, Japan

[21] Appl. No.: 439,636

[22] Filed: May 12, 1995

[30] Foreign Application Priority Data

May 20, 1994 [JP] Japan ..................................... 6-106641

[51] Int. Cl.⁶ ............................ H04N 5/21; H04N 5/213; H04N 5/217

[52] U.S. Cl. .......................... 348/241; 348/607; 386/114; 455/296

[58] Field of Search .................................... 348/616, 618, 348/622, 623, 222, 241, 535, 534, 606, 607, 250; 455/303, 306, 308, 296; 386/21, 114, 115

[56] References Cited

U.S. PATENT DOCUMENTS

| | | | |
|---|---|---|---|
| 4,283,742 | 8/1981 | Izumita et al. | 358/213 |
| 4,667,225 | 5/1987 | Kanda | 358/36 |
| 4,751,455 | 6/1988 | Ayres | 324/57 N |
| 4,910,604 | 3/1990 | Takei et al. | 358/310 |
| 5,309,183 | 5/1994 | Sasaki et al. | 348/233 |

FOREIGN PATENT DOCUMENTS 06029505 2/1928 Japan.

OTHER PUBLICATIONS

"Video Recording Technology," Nobutoshi Kihara, Electronics Science Series, Sanpo Publication.

*Primary Examiner*—Thai Tran
*Assistant Examiner*—Christopher Onuaku
*Attorney, Agent, or Firm*—Fitzpatrick, Cella, Harper & Scinto

[57] ABSTRACT

A noise reduction device employing a sample and hold circuit includes a high-pass filter to which input signals are provided. A sample and hold circuit is provided to which an output from the high-pass filter is provided. A limiter is included for limiting the amplitude of an output from the sample and hold circuit. A differential amplifier receives the input signals and the output from the limiter, and outputs noise-reduced signals.

10 Claims, 9 Drawing Sheets

NOISE REDUCTION DEVICE EMPLOYING A SAMPLE AND HOLD CIRCUIT, AND AN IMAGE PICKUP DEVICE USING THE NOISE REDUCTION DEVICE

BACKGROUND OF THE INVENTION

1. Field of the Invention

The present invention relates to a noise reduction device for reducing noise contained in video signals or the like, and to an image pickup device employing such a noise reduction device.

2. Description of the Related Art

As a conventional noise reduction device, there is a known device shown in FIG. 1 and described at pages 129 and 130 of "Video Recording Technology" written by Nobutoshi Kihara and published in the Electronics Science Series, Sanpo Publication. Although this device is described as a noise reduction device in that book, it has been widely used as a noise reduction device for a video camera.

In FIG. 1, reference numeral 101 denotes a high-pass filter (hereinafter referred to simply as a filter) for extracting high frequency components from input signals; reference numeral 102 denotes a limiter for limiting the amplitude of signals which are passed through the high-pass filter 101; and reference numeral 103 denotes a differential amplifier for computing a difference between the input signals and the signals output from the limiter 102.

In the above-described construction, input signals, such as video signals, are directly added to one of the input terminals of the differential amplifier 103, and also the high frequency components of the input signals are extracted by the filter 101. Signals having high frequency components greater than the noise level are removed by the limiter 102 and become noise components. These components are input to the other input terminal of the differential amplifier 103 whereby the noise components are subtracted from the original input signals. Therefore, it is possible to obtain from the differential amplifier 103 signals having reduced noise.

FIG. 2 is a block diagram illustrating the construction of a video camera employing the noise reduction device shown in FIG. 1.

In FIG. 2, reference numeral 110 denotes a CCD serving as an image pickup element; reference numeral 111 denotes a sample and hold circuit for sample-holding video signals output from the CCD 110 and holding the video signals at the same signal level for a period corresponding to the pixels of the CCD 110 (where one pixel is for one clock of 14.318 MHz); reference numeral 112 denotes a camera process circuit which performs gamma correction on the signals received from the sample and hold circuit and which decodes signals from the color filters (not shown) on the CCD 110; reference numeral 113 denotes a driver for driving the CCD 110; reference numeral 114 denotes a timing generator for generating various pulses necessary for driving the CCD 110 and the sample and hold circuit 111; and reference numeral 115 denotes a video synchronization signal generator for driving the camera process circuit 112 and the timing generator 114.

Reference numeral 116 denotes a noise reduction device for reducing noise in the signals output from the camera process circuit 112; reference numeral 117 denotes a filter; reference numeral 118 denotes a limiter; reference numeral 119 denotes a differential amplifier; and reference numeral 120 denotes a video output terminal of the video camera.

FIG. 3(A) shows the filter characteristics of the filter 117. Although the filter 117 having high-pass characteristics is used in this example, a band pass filter having filter characteristics such that a color subcarrier frequency of 3.58 MHz is a central frequency (as shown in FIG. 3(B)) may be used.

Next, the operation of the video camera shown in FIG. 2 will be described.

The video synchronization signal generator 115 sends horizontal and vertical synchronization signals in conformity with the NTSC standard to the timing generator 114. The timing generator 114 outputs pulses for various timings necessary for driving the CCD 110 and the sample and hold circuit 111, in synchronization with the aforesaid horizontal and vertical synchronization signals, to the driver 113 and the sample and hold circuit 111.

The driver 113 drives the CCD 110 whereby video signals are output in synchronization with the horizontal and vertical synchronization signals. This output from the CCD 110 is sample-held by, for example, a sampling signal of 4×fsc (fsc is the color subcarrier frequency 3.58 MHz of the NTSC standard), i.e., 14.318 MHz by the sample and hold circuit 111, and is sent to the camera process circuit 112 as video signals corresponding to the pixels of the CCD 110.

In the camera process circuit 112, gamma correction, color decoding of complementary checkered color filters and addition of decoding synchronization signals are performed, and the video signals are output as luminance video signals.

With video cameras becoming more compact, the S/N ratio of the luminance video signals tends to deteriorate as the photoreceiving area of the CCD 110 becomes smaller along with the CCD chip size becoming more compact to ⅓ and ¼ of an inch. For this reason, the noise reduction device 116 is added.

In the noise reduction device 116, the high frequency components of the luminance signals are extracted by the filter 117, these high frequency components are added to the limiter 118 whereby those components over a fixed amplitude are clipped, after which the components are sent to the differential amplifier 119 whereby only those components having a frequency higher than that of the original luminance signals and a very small amplitude, that is, only noise components, are subtracted, and thus luminance signals having improved an S/N ratio are output.

Next, a conventional example of a digital video camera having a noise reduction device will be described with reference to FIG. 4.

In FIG. 4, the CCD 110, the sample and hold circuit 111, the driver 113, the timing generator 114 and the video synchronization signal generator 115 are the same as those in FIG. 2 and have the same functions.

Referring to FIG. 4, reference numeral 130 denotes an A/D converter for converting sample-held signals to digital signals; reference numeral 131 denotes a digital noise reduction device to which the aforesaid digital signals are added; reference numeral 132 denotes a digital camera process circuit; reference numeral 134 denotes a D/A converter for converting an output from the digital camera process circuit 132 into analog signals; reference numeral 135 denotes an analog noise reduction device; and reference numeral 136 denotes a composite synchronization signal adder.

The operation in FIG. 4 is one in which the analog operation in FIG. 2 is digitized and is performed in the following way. Video signals which are sample-held by the sample and hold circuit 111 are converted by the A/D converter 130 into, for example, 10-bit digital video signals and sent to the digital noise reduction device 131. The digital noise reduction device 131 has the construction shown in FIG. 5, and is realized by making the analog noise reduction device of FIG. 1 formed by digital circuitry.

In FIG. 5, reference numerals 141, 142, 144, 146, 148 and 150 each denote delay circuits, and $Z^{-n}$ means that a delay for n pixel clocks (one pixel is for one clock of 14.318 MHz) is generated. Reference character Z indicates Z transform conversion in the circuit theory, and $Z^{-1}$ is a unit delay operator. Reference numerals 143, 145 and 153 denote subtracters, and reference numerals 147, 149 and 151 denote adders.

The delay circuits 141, 142, 144, 146, 148 and 150, the subtracters 143 and 145, and the adders 147, 149 and 151 constitute a band-pass digital filter 133 having a frequency of 3.58 MHz as the center, whose characteristic is described as follows:

$$(1-Z^{-2})^2(1+Z^{-4})^2(1+Z^{-8}) \tag{1}$$

The band-pass digital filter 133, a limiter 152, the delay circuit 141 and the subtracters 153 constitute the digital noise reduction device 131.

In FIG. 4, the output from the digital noise reduction device 131 is sent to the digital camera process circuit 132, and gamma correction, color decoding of the color filters of the CCD 110 and camera processings are performed digitally. The digitized signals are converted to analog video signals by the D/A converter 134, and a composite synchronization signal from the video synchronization signal generator 115 is added by the adder 136, and thus luminance signals are obtained.

The luminance signals are sent to the analog noise reduction device 135 whereby noise components generated in the digital system are further removed, and thus composite luminance signals having improved S/N are output to terminal 120.

Although the digital noise reduction device 131 is disposed immediately after the A/D converter 130 in FIG. 4, the digital noise reduction device 131 may be disposed immediately before the D/A converter 134. Also, in some cases, the digital noise reduction device 131 is incorporated as a part of the digital camera process circuit 132.

In the meantime, the applicant of the present invention has proposed an invention of a CCD type detachable head video camera (to be described below) in a Japanese Patent Application No. 06-029505 (filed on Feb. 28, 1994). One of the purposes of the CCD type detachable head video camera is to provide a video camera suitable for a desk-top TV conference system employing a desk-top computer. Therefore, a video camera having a new construction shown in FIG. 6 may be designed with the following three items as guidelines:

(1) To realize a compact camera requiring a small amount of space, components from a CCD to a sample and hold circuit are mounted in the camera head section, and the subsequent circuitry is placed on the expansion board of the computer.

(2) Since a digital camera process circuit is mounted on the expansion board inside the computer housing, a digital camera process circuit which is resistant against noise is used.

(3) A digital video interface is disposed on the expansion board so as to send signals to a moving picture codec (coder and decoder) for performing digital compression of video images for a TV conference.

FIG. 6 is formed of the same blocks as FIG. 4, but, in FIG. 6, the circuit blocks mounted in a camera head section 10 are separated from the circuit blocks mounted on an expansion board 11. Referring to FIG. 6, the camera head section 10 and the expansion board 11 each have dedicated connectors 12 and 13, and the connectors 12 and 13 are electrically connected to each other through a cable 14. Also, a digital video interface 15 for sending the output from the digital camera process circuit 132 to an external moving picture codec is disposed on the expansion board 11.

However, it has been found that the following problems occur in the construction of FIG. 6.

That is, a video data compression apparatus for TV conferencing (called a moving picture codec, and the compression method includes H.261 of the CCITT standard) is very sensitive to very small variations of an input image. If the S/N ratio of video signals is not sufficient, the compression rate is decreased, and the transmission frame rate is decreased.

The effect of the digital noise reduction device 131 of FIG. 6 alone is not enough. The above problems may become a major problem particularly when a CCD 110 of ¼ inch, which is the current minimum, is used.

SUMMARY OF THE INVENTION

The present invention has been achieve to solve the above-described problems. It is an object of the present invention to obtain a noise reduction device capable of improving the S/N ratio of digital video signals and an image pickup device employing such a device.

According to one aspect of the present invention, there is provided a noise reduction device comprising: a high-pass filter to which input signals are added; a sample and hold circuit to which an output from the high-pass filter is added; a limiter for limiting the amplitude of an output from the sample and hold circuit; and a differential amplifier to which the input signals and the output from the limiter are added.

According to another aspect of the present invention, there is provided a noise reduction device comprising: a high-pass filter to which input signals are added; a sample and hold circuit to which an output from the high-pass filter is added; an inversion circuit to which an output from the sample and hold circuit is added; a limiter for limiting the amplitude of an output from the sample inversion circuit; and an adder for adding the input signals to the output of the limiter.

According to a further aspect of the present invention, there is provided a noise reduction device comprising: a high-pass filter to which input signals are added; a first sample and hold circuit to which an output from the high-pass filter is added; a limiter for limiting the amplitude of an output from the first sample and hold circuit; a second sample and hold circuit to which the input signals are added; and a differential amplifier to which an output of the second sample and hold circuit and an output from the limiter are added.

According to a still further aspect of the present invention, there is provided a noise reduction device comprising: a high-pass filter to which input signals are added; a first sample and hold circuit to which an output from the high-pass filter is added; an inversion circuit to which an output from the first sample and hold circuit is added; a limiter for limiting the amplitude of an output from the inversion circuit; a second sample and hold circuit to which the input signals are added; and an adder for adding the output of the second sample and hold circuit to the output of the limiter.

According to a still further aspect of the present invention, there is provided a noise reduction device having the above-described construction in the stage anterior to the A/D converter in an image pickup device comprising: a first portion in which an image pickup element and a sample and hold circuit to which an output from the image pickup element is added are disposed; and a second portion in which an A/D converter to which a sample and hold output of the sample and hold circuit is added, and a digital camera process circuit for signal processing digital data obtained from the A/D converter are disposed.

According to a still further aspect of the present invention, there is provided a noise reduction device having the above-described construction in the stage anterior to the A/D converter of the second portion in order to reduce noise of the sample and hold output in an image pickup device comprising the above-described first and second portions.

According to a still further aspect of the present invention, there is provided a noise reduction device having the above-described construction in order to reduce noise of the sample and hold output in the stage anterior to the A/D converter of the second portion.

According to a still further aspect of the present invention, there is provided a noise reduction device having the above-described construction in order to reduce noise of the sample and hold output in the stage anterior to the A/D converter of the second portion in an image pickup device comprising the above-described first and second portions.

According to one embodiment of the present invention, an output from a high-pass filter is sample-held and added to a limiter, and then the output from this limiter and the input signal are added to a differential amplifier. Thus, in a case where this noise reduction device is disposed in the stage anterior to an A/D converter, noise is effectively reduced.

According to another embodiment of the present invention, an output from a high-pass filter is sample-held and inverted, after which it is added to a limiter, and then the output from this limiter and the input signal are added. Thus, noise is effectively reduced in the stage anterior to an A/D converter. Also, since no differential amplifier is used, this embodiment is suitable for a case in which the noise reduction device is constituted of discrete transistors.

According to a further embodiment of the present invention, an input signal is sample-held and an output from a high-pass filter is sample-held and added to a limiter, after which the output from this limiter and the input signal are added to a differential amplifier. Thus, in a case where this noise reduction device is disposed in the stage anterior to an A/D converter, noise is effectively reduced, and also no glitch (a perturbation of the pulse waveform) occurs in the output of the differential amplifier.

According to a still further embodiment of the present invention, an input signal is sample-held and an output from a high-pass filter is sample-held and inverted, and then added to a limiter, after which the output from this limiter and the input signal are added. Thus, noise is effectively reduced in the stage anterior to the A/D converter, and also no glitch occurs in the output of the adder. Also, since no differential amplifier is used, this embodiment is suitable for a case in which the noise reduction device is constituted of discrete transistors.

According to a still further embodiment of the present invention, noise of the sample and hold output of an image pickup element from a first portion of the image pickup device is reduced by the noise reduction device disposed in the stage anterior to the A/D converter in the second portion. Thus, the S/N ratio of the digital video signals processed by the second portion is improved.

According to a still further embodiment of the present invention, noise of the sample and hold output of an image pickup element from a first portion of the image pickup device is reduced by the noise reduction device disposed in the stage anterior to the A/D converter in a second portion of the image pickup device. Thus, the S/N ratio of the digital video signals processed by the second portion is improved, and also the image pickup device is simple in construction.

According to a still further embodiment of the present invention, noise of the sample and hold output of an image pickup element from a first portion of the image pickup device is reduced by the noise reduction device disposed in the stage anterior to the A/D converter in a second portion of the image pickup device. Thus, the S/N ratio of the digital video signals processed by the second portion is improved, and also no glitch occurs in the output of the noise reduction device.

According to a still further embodiment of the present invention, noise of the sample and hold output of an image pickup element from a first portion of the image pickup device is reduced by the noise reduction device disposed in the stage anterior to the A/D converter in a second portion of the image pickup device. Thus, the S/N ratio of the digital video signals processed by the second portion is improved, no glitch occurs in the output of the noise reduction device, and also the noise reduction device is simple in construction.

The above and further objects and novel features of the invention will be more fully apparent from the following detailed description when read in connection with the accompanying drawings.

DESCRIPTION OF THE PREFERRED EMBODIMENTS

Figure 7:
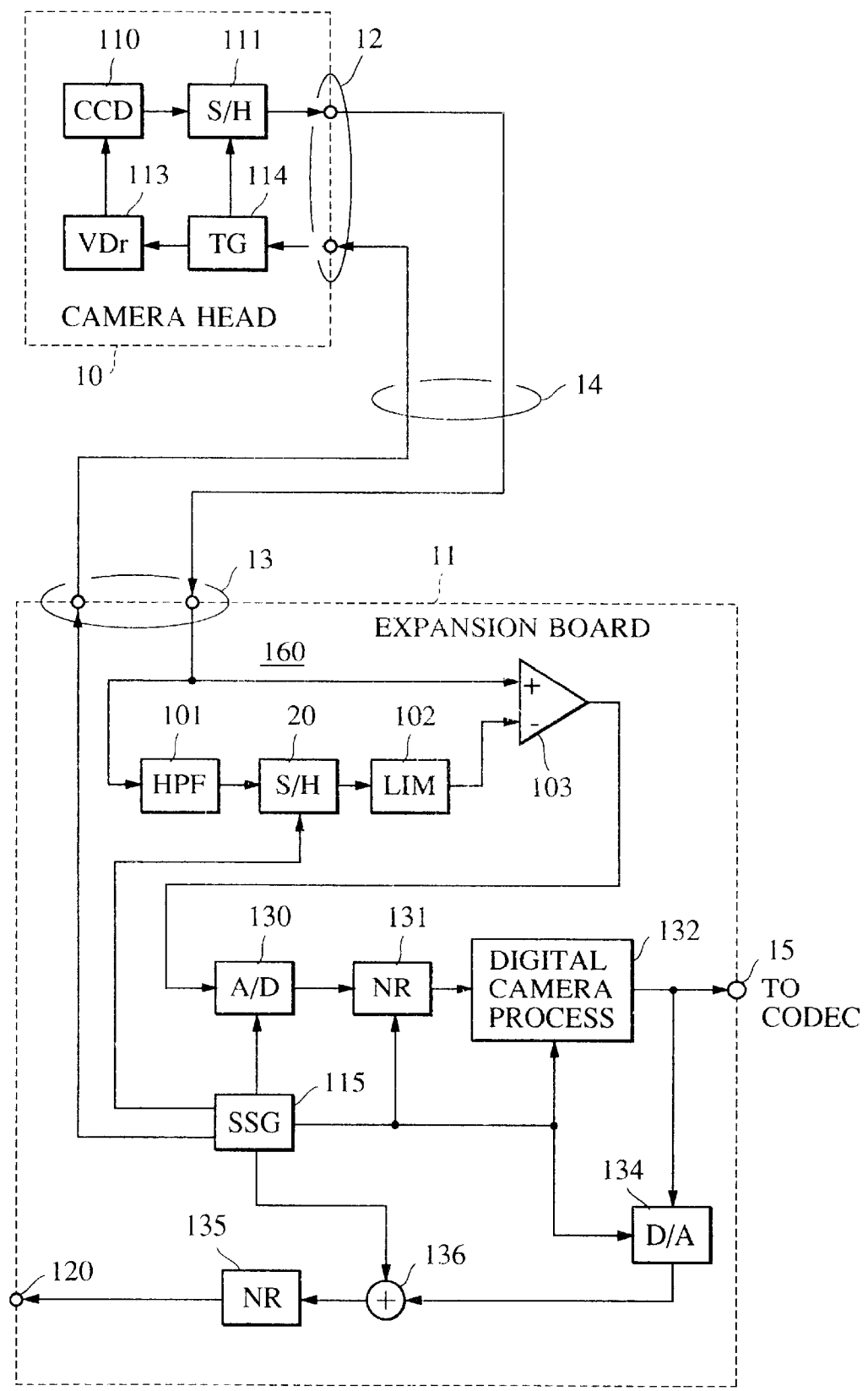
FIG. 7 is a block diagram illustrating an embodiment of a video camera employing a noise reduction device according to a first embodiment of the present invention.

FIG. 7 shows an embodiment in which the present invention is applied to a CCD type detachable head video camera.

Components in FIG. 7 which substantially correspond to those in FIGS. 1 to 6 are given the same reference numerals, and a detailed explanation of the functions of each section is omitted.

Referring to FIG. 7, the camera head 10 is formed with a CCD 110, a sample and hold circuit 111, a driver 113, a timing generator 114, and a connector 12.

Figure 1:
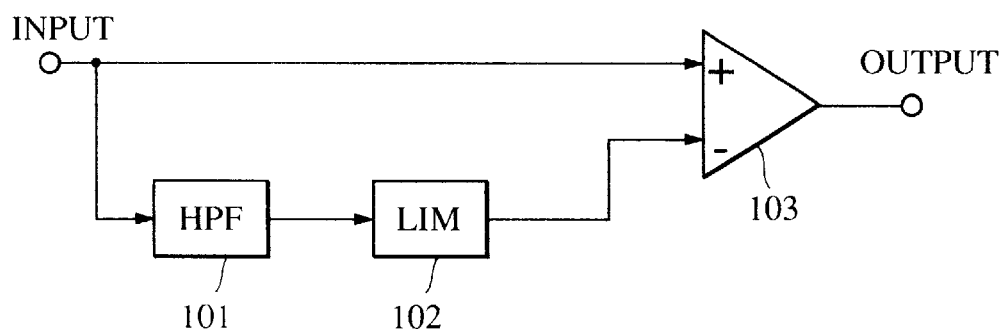
FIG. 1 is a block diagram illustrating a conventional noise reduction device.
Figure 2:
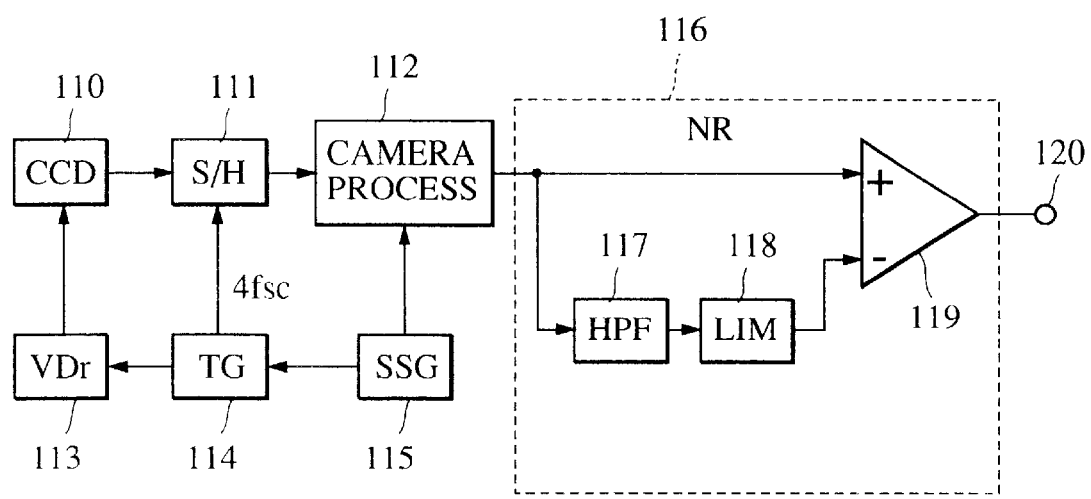
FIG. 2 is a block diagram illustrating a conventional video camera apparatus employing a noise reduction device.
Figure 5:
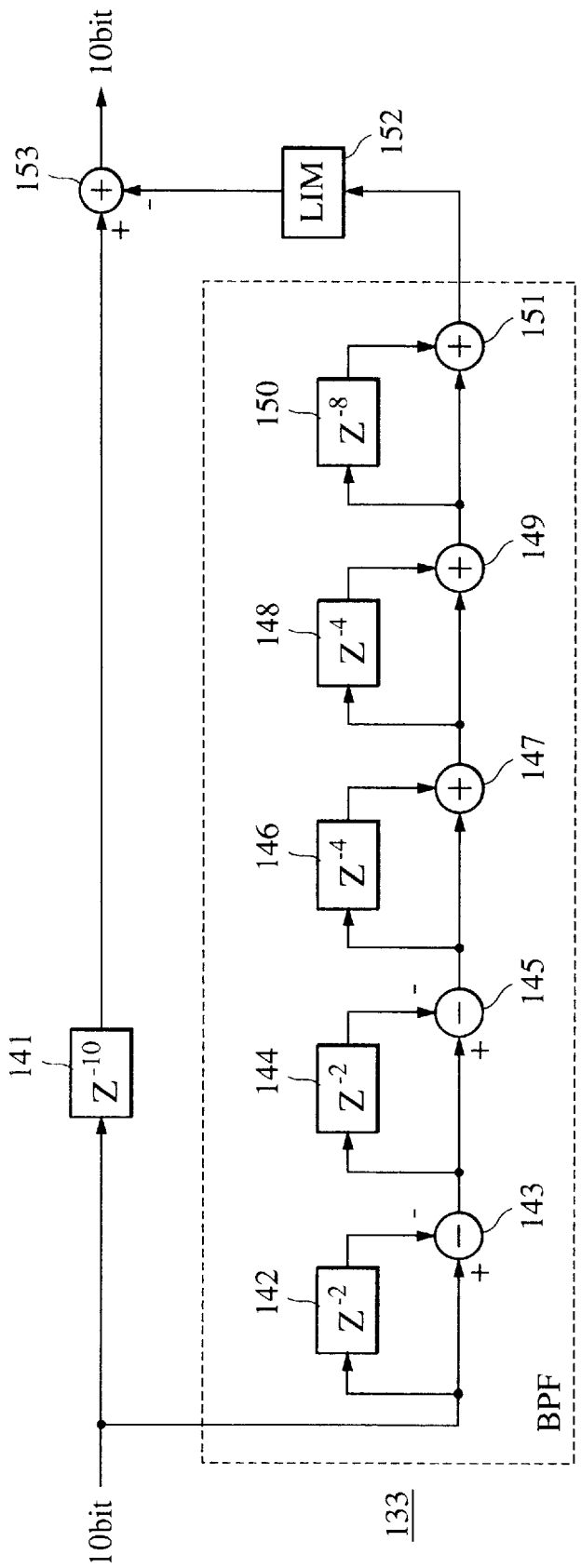
FIG. 5 is a block diagram illustrating a conventional digital band-pass filter.
Figure 6:
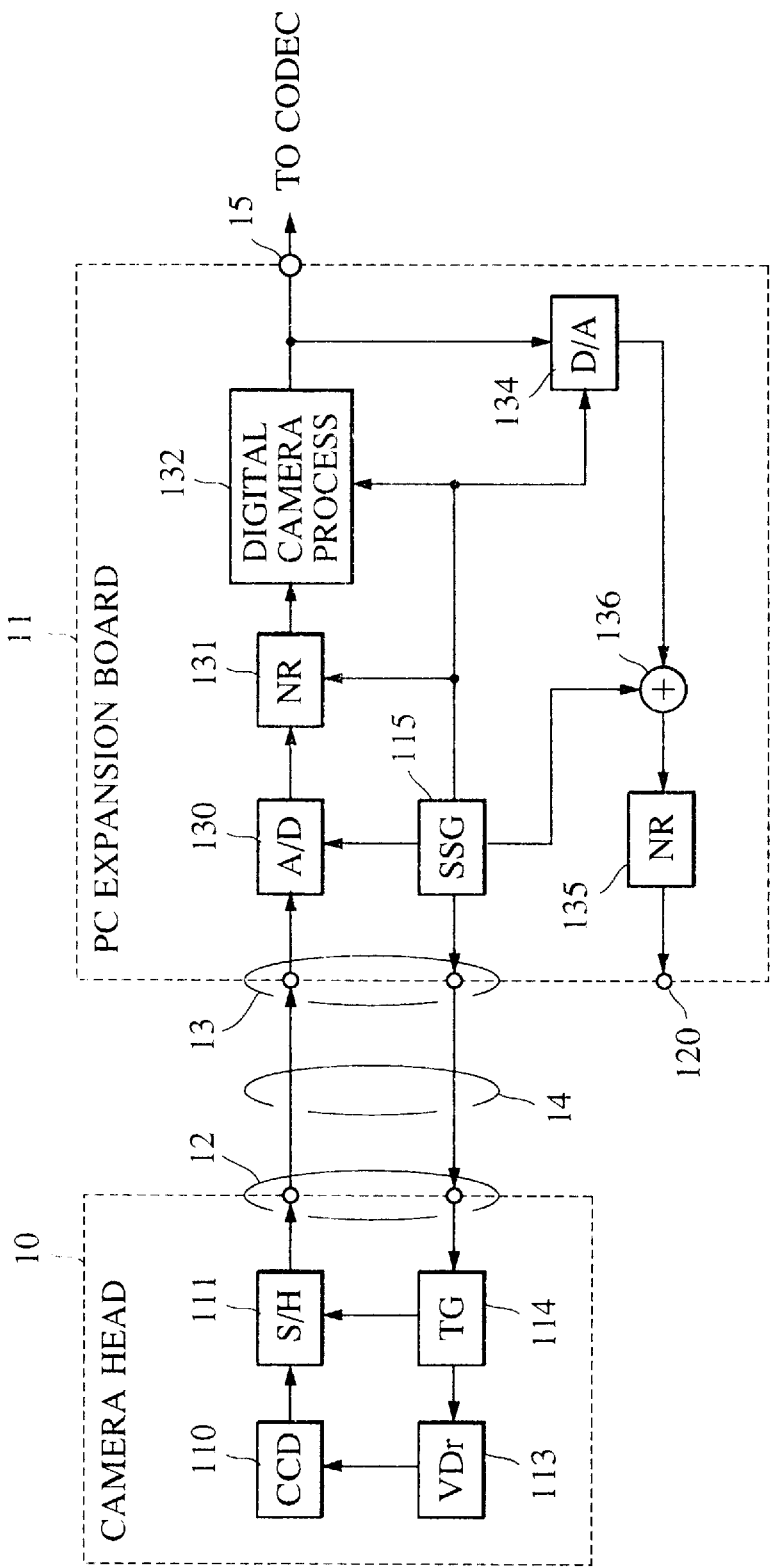
FIG. 6 is a block diagram illustrating a CCD type detachable head video camera relating to this invention.

Provided on the expansion board 11 are the connector 13, an analog noise reduction device 160 according to the present invention, the A/D converter 130, a digital noise reduction device 131 having the same construction as, for example, in FIG. 5, a digital camera process circuit 132, a D/A converter 134, an adder 136, an analog noise reduction device having the same construction as, for example, in FIG. 1, an output terminal 120, a video synchronization signal generator 115, a digital video interface 15 and the like.

The camera head 10 is connected to the expansion board 11 through a cable 14 via the connectors 12 and 13.

The noise reduction device 16.0 of the present invention is formed with the filter 101, the limiter 102 and the differential amplifier 103, a sample and hold circuit 20 being disposed between the filter 101 and the limiter 102. The sample and hold circuit 20 is so designed as to be driven by a sampling pulse of, for example, 4 fsc from the video synchronization signal generator 115.

Figure 9:
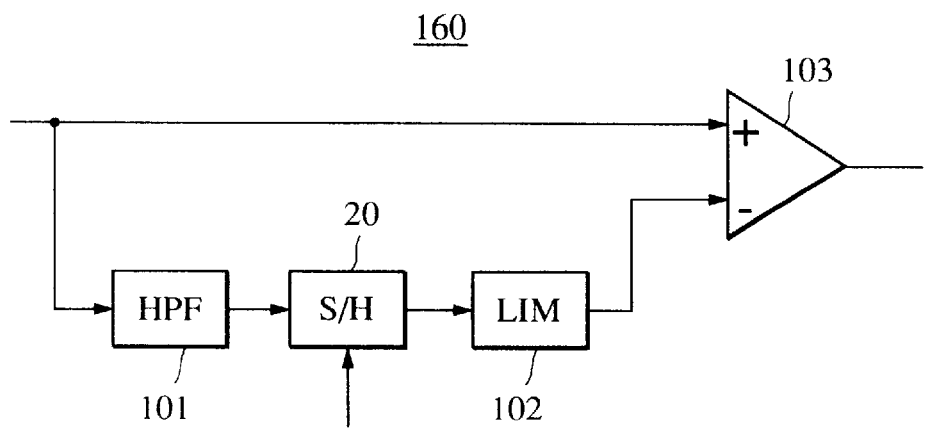
FIG. 9 is a block diagram illustrating the noise reduction device according to the first embodiment of the present invention.

The analog noise reduction device 160 shown in FIG. 7 is based on the first embodiment of the present invention, and has the same construction as shown in FIG. 9.

Next, the operation of the FIG. 7 structure having the above-described construction will be described.

The video synchronization signal generator 115 on the expansion board 11 sends, for example, horizontal and vertical synchronization signals in conformity with the NTSC standard to the timing generator 114 through the cable 14. The timing generator 114 outputs pulses of various timings necessary for driving the CCD 110 in synchronization with the horizontal and vertical synchronization signals and sends the pulses to the driver 113.

The driver 113 drives the CCD 110 so that the CCD 110 outputs video signals in synchronization with the horizontal and vertical synchronization signals. This CCD output is sample-held by the sample and hold circuit 111 by using a pixel clock of, for example, 4 fse (14.318 MHz) from the timing generator 114, and is sent out to the expansion board 11 as video signals corresponding to the pixel outputs of the camera head 10 through the connectors 12 and 13 and the cable 14.

Figure 3A:
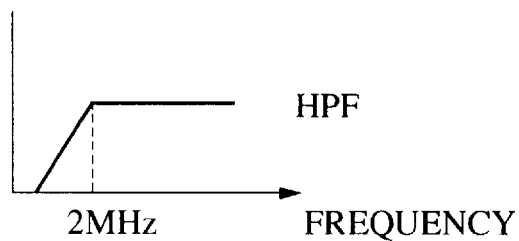
FIGS. 3(A) and 3(B) show characteristics of a filter.
Figure 8:
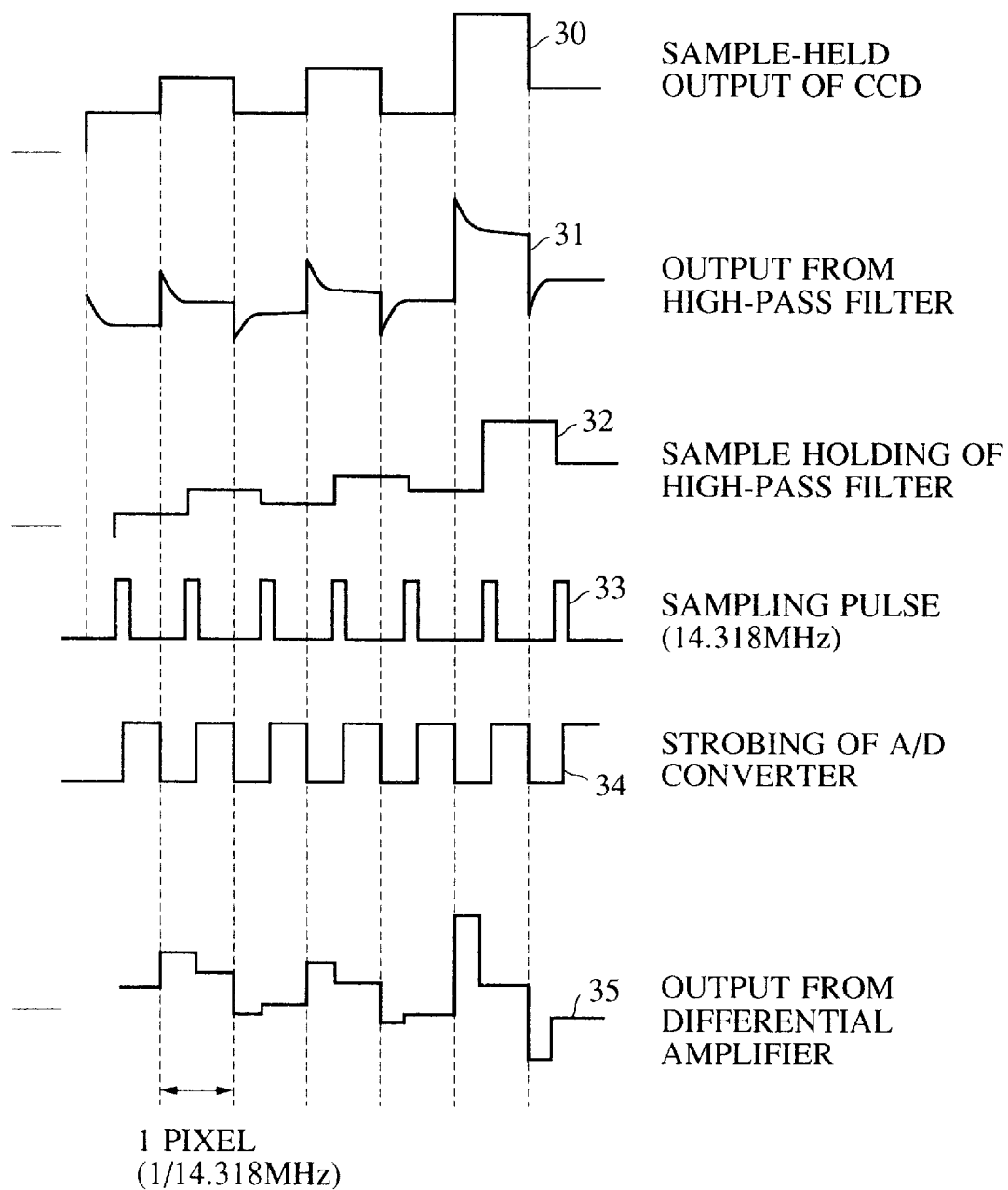
FIG. 8 is a timing chart illustrating the operation of the noise reduction device according to the first embodiment of the present invention.

The waveform of the video signals, as the CCD output, is shown at 30 in FIG. 8. This video signal is first added to the analog noise reduction device 160 in the expansion board 11 and then added to the filter 101 and the differential amplifier 103 of the analog noise reduction device 160. The characteristic of the filter 101 is, for example, a first-order high-pass filter whose cutoff frequency is 2 MHz, as shown in FIG. 3(A). The waveform of the output of the filter 101 is shown at 31 in FIG. 8. When this filter output is sample-held by the sample and hold circuit 20 in accordance with a predetermined sampling pulse (e.g., a pulse shown at 33 in FIG. 8) from the video synchronization signal generator 115, the output waveform is as shown at 32 in FIG. 8.

The sample and hold output is sent to the limiter 102 whereby components over a fixed amplitude are limited to a predetermined value, and also the components of less than the fixed amplitude are processed so as to be passed as they are.

The output of the limiter 102 is sent to the differential amplifier 103 whereby an operation for subtracting the output of the limiter from the sample-held video signal (shown at 30 in FIG. 8) is performed. Therefore, of the noise components contained in the video signal, those in the high frequencies and at a low level are removed by the differential amplifier 103. The waveform of the output of the differential amplifier 103 is shown at 35 in FIG. 8.

A glitch is caused in the output waveform 35 of the differential amplifier 103 due to the time lag between the the CCD output (shown at 30 in FIG. 8) which was sample-held and the output (shown at 32 in FIG. 8) of the filter 101. The influence of this glitch can be removed by A/D conversion performed for only a predetermined strobe period as shown at 34 in FIG. 8 in the A/D converter 130 in the next stage.

The video signals converted into digital data by the A/D converter 130 are subjected to predetermined noise reduction processing in the digital noise reduction device 131, after which the signals are sent to the digital camera process circuit 132.

In the digital camera process circuit 132, gamma correction and color decoding of, for example, complementary checkered color filters of a CCD are performed. The processed signals are output from the digital video interface 15 to an external moving picture apparatus (a moving picture codec).

At the same time, the output of the digital camera process circuit 132 is sent to the D/A converter 134 whereby the output is converted into analog video signals. The analog video signals have a composite synchronization signal added by the adder 136 and become a composite video signal. Noise of this composite video signal is reduced by the analog noise reduction device 135 and then output to a television monitor or the like via a low-pass filter (not shown).

Figure 10:
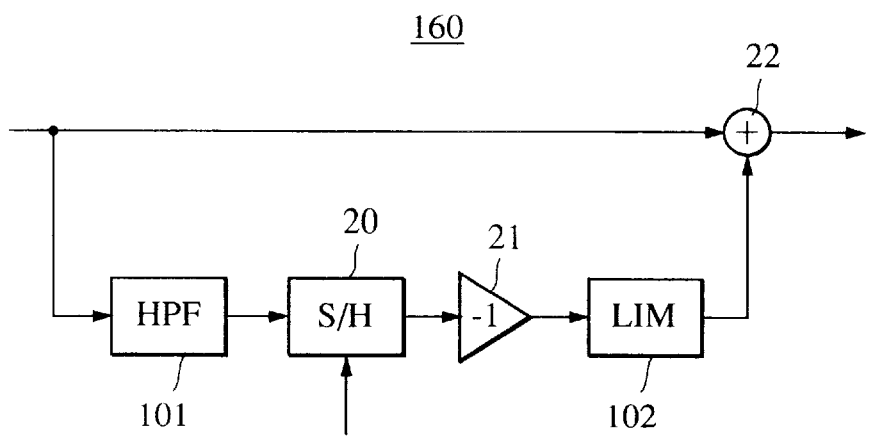
FIG. 10 is a block diagram illustrating the noise reduction device according to a second embodiment of the present invention.

FIG. 10 shows a second embodiment of the analog noise reduction device 160.

In FIG. 10, the filter 101 and the sample and hold circuit 20 are disposed, and also an inversion circuit 21 for inverting the sample and hold output of the sample and hold circuit 20 is provided. The inverted output is added to the limiter 102, and the limiter output and the input signal are added by an adder 22. The principle of noise reduction according to the construction of the second embodiment is the same as that in FIG. 9. However, this construction is suitable when designing an analog noise reduction device 160 using discrete transistors. That is, the inversion circuit 21 in FIG. 10 can be constituted using one transistor, and the adder 22 can be realized by addition of resistors. Therefore, it becomes advantageous in terms of cost as compared with a case in which the differential amplifier 103 of FIG. 9 is used.

Figure 11:
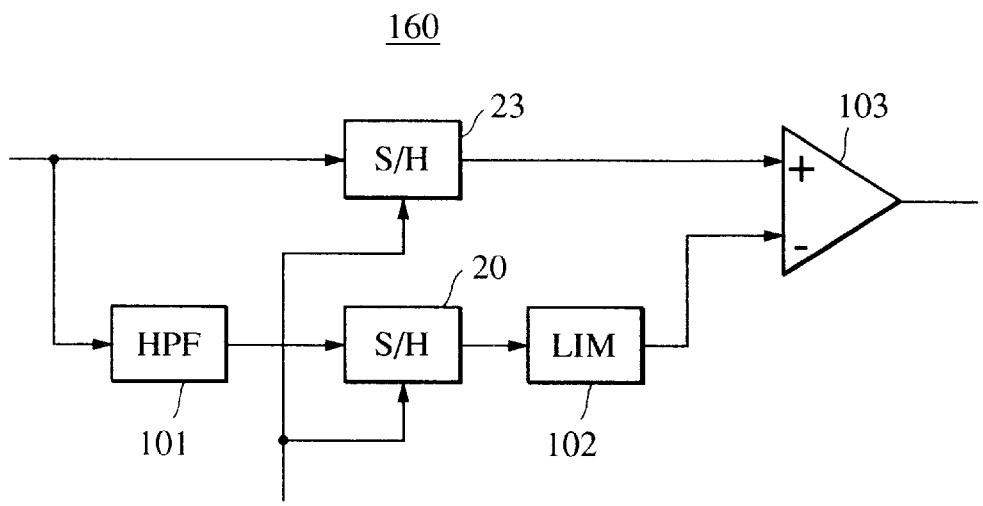
FIG. 11 is a block diagram illustrating the noise reduction device according to a third embodiment of the present invention.

FIG. 11 shows a third embodiment of a noise reduction device. Referring to FIG. 11, a second sample and hold circuit 23 for sample-holding input signals is additionally disposed in the circuit of FIG. 9, and the sample and hold output from the second sample and hold circuit 23 is added to the differential amplifier 103. The second sample and hold circuit 23 samples the sample-held CCD output again at the same-timing as the sampling pulse (shown at 33 in FIG. 8) of the first sample and hold circuit 20 in order to make the timings of both inputs + and − of the differential amplifier 103 coincide with each other so that the glitch of the output of the differential amplifier designated at 35 in FIG. 8 is removed.

Figure 12:
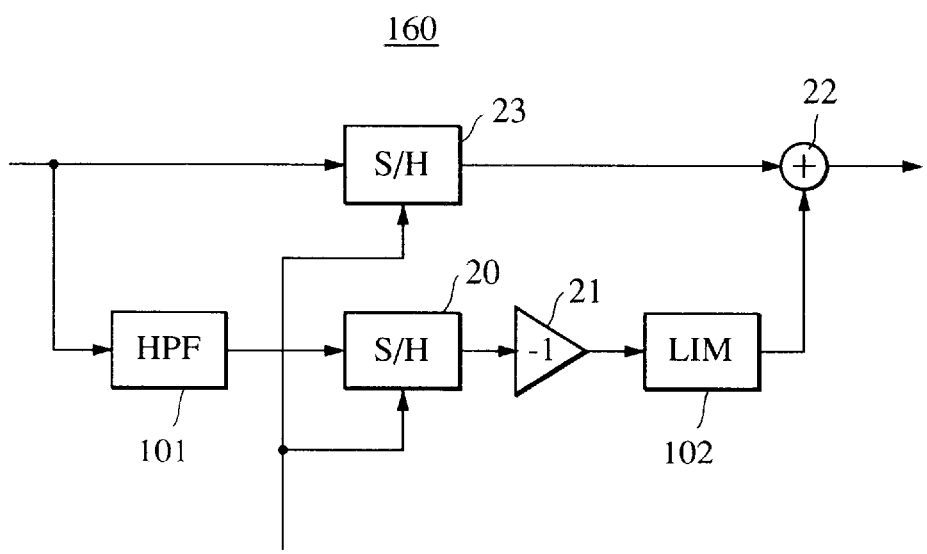
FIG. 12 is a block diagram illustrating the noise reduction device according to a fourth embodiment of the present invention.

FIG. 12 shows a fourth embodiment of the analog noise reduction device 160. FIG. 12 shows a construction in which the components of FIGS. 10 and 11 are combined. The output of the filter 101 is added to the first sample and hold circuit 20, and the sample and hold output thereof is inverted by the inversion circuit 21 and added to the limiter 102. Also, the input signal is added to the second sample and hold circuit 23, and the sample and hold output thereof and the output of the limiter 102 are added by the adder 22. The construction of FIG. 12 is suitable when designing an analog noise reduction device 160 using discrete transistors.

Figure 3B:
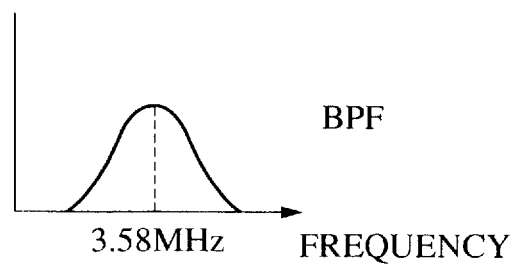
Figure 4:
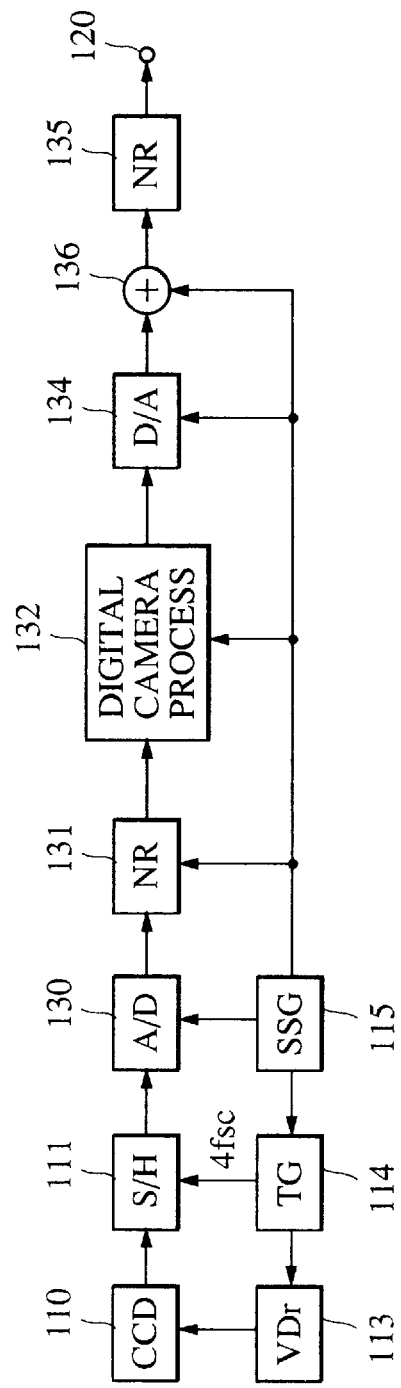
FIG. 4 is a block diagram illustrating a conventional digital video camera.

Each analog noise reduction device 160 according to each embodiment described above with reference to FIGS. 10 to 12 can be added to the CCD type detachable head video camera of FIG. 7. Although the high-pass filter used in each embodiment which has the characteristic shown in FIG. 3(A) is used, a high-pass filter shown in FIG. 3(B) may be used. In these embodiments, a filter having the characteristics shown in FIGS. 3(A) and 3(B) is used substantially as a high-pass filter.

As has been described up to this point, according to the embodiments of the present invention, an output from a high-pass filter is sample-held and added to a limiter, and then the output from this limiter and the input signal are added in a differential amplifier. Thus, in a case where the noise reduction device is disposed in the stage anterior to an A/D converter, noise can be effectively reduced.

According to one embodiment of the present invention, an output from a high-pass filter is sample-held and inverted, after which the output is added to a limiter, and then this limiter output and the input signal are added. Thus, noise is effectively reduced in the stage anterior to the A/D converter. Also, since no differential amplifier is used, this embodiment is suitable for a case in which the noise reduction device is constituted of discrete transistors. Therefore, the present invention can be realized at a low cost.

According to another embodiment of the present invention, an input signal is sample-held and an output from a high-pass filter is sample-held and added to a limiter, after which this limiter output and the input signal are added in a differential amplifier. Thus, in a case where a noise reduction device is disposed in the stage anterior to an A/D converter, noise is effectively reduced, and also no glitch occurs in the output of the differential amplifier. Therefore, it is possible to make allowance for a conversion timing in an A/D converter.

According to a further embodiment of the present invention, an input signal is sample-held and an output from a high-pass filter is sample-held and inverted, and then added to a limiter, after which the output from this limiter and the input signal are added. Thus, noise is effectively reduced in the stage anterior to the A/D converter, and also no glitch occurs in the output of the adder. Therefore, it is possible to make allowance for a conversion timing in an A/D converter. Also, since no differential amplifier is used, this embodiment is suitable for a case in which the noise reduction device is constituted of discrete transistors, and the cost of the image pickup device can be reduced.

According to a still further embodiment of the present invention, noise of the sample and hold output of an image pickup element from a first portion of the image pickup device is reduced by the noise reduction device disposed in the stage anterior to the A/D converter in a second portion of the image pickup device. Thus, the S/N ratio of the digital video signals processed by the second portion is improved.

According to a still further embodiment of the present invention, noise of the sample and hold output of an image pickup element from a first portion of the image pickup device is reduced by the noise reduction device disposed in the stage anterior to the A/D converter in a second portion of the image pickup device. Thus, the S/N ratio of the digital video signals processed by the second portion is improved, and also the noise reduction device is simple in construction.

According to a still further embodiment of the present invention, noise of the sample and hold output of an image pickup element from a first portion of the image pickup device is reduced by the noise reduction device disposed in the stage anterior to the A/D converter in a second portion of the image pickup device. Thus, the S/N ratio of the digital video signals processed by the second portion is improved, and also no glitch occurs in the output of the noise reduction device.

According to a still further embodiment of the present invention, noise of the sample and hold output of an image pickup element from a first portion of the image pickup device is reduced by the noise reduction device disposed in the stage anterior to the AID converter in a second portion of the image pickup device. Thus, the S/N ratio of the digital video signals processed by the second portion is improved, no glitch occurs in the output of the noise reduction device, and also the noise reduction device is simple in construction.

According to the embodiments of the present invention, the transmission frame rate can be improved in a case in which digital video signals processed by the first portion of the image pickup device are compressed.

According to the embodiments of the present invention, no glitch occurs. Thus, it is possible to make allowance for a conversion timing in an A/D converter.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications, equivalent structures and functions.

What is claimed is:

1. A noise reduction device, comprising:

a high-pass filter to which input signals are provided;

a sample and hold circuit to which an output from said high-pass filter is provided;

a synchronization signal generator generating sampling pulses driving said sample and hold circuit and a sample and hold circuit of a video camera, the output of the sample and hold circuit of the video camera being input into said high pass filter, said generator generating sampling pulses of the same frequency to drive both sample and hold circuits;

a limiter for limiting the amplitude of an output from said sample and hold circuit of said noise reduction device; and a differential amplifier for receiving said input signals and said output from said limiter, and for outputting noise-reduced signals.

2. A noise reduction device, comprising:

a high-pass filter to which input signals are provided;

a sample and hold circuit to which an output from said high-pass filter is provided;

a synchronization signal generator generating sampling pulses driving said sample and hold circuit and a sample and hold circuit of a video camera, the output of the sample and hold circuit of the video camera being input into said high pass filter, said generator generating sampling pulses of the same frequency to drive both sample and hold circuits;

an inversion circuit to which an output from said sample and hold circuit of said noise reduction device is provided;

a limiter for limiting the amplitude of an output from said inversion circuit; and an adder for adding said input signals and an output of said limiter, and for outputting noise-reduced signals.

3. A noise reduction device, comprising:

a high-pass filter to which input signals are provided;

a first sample and hold circuit to which an output from said high-pass filter is provided;

a synchronization signal generator generating sampling pulses driving said first sample and hold circuit and a sample and hold circuit of a video camera, the output of the sample and hold circuit of the video camera being input into said high pass filter, said generator generating sampling pulses of the same frequency to drive both sample and hold circuits;

a limiter for limiting the amplitude of an output from said first sample and hold circuit;

a second sample and hold circuit to which said input signals are provided; and a differential amplifier for receiving an output of said second sample and hold circuit and an output of said limiter, and for outputting a noise-reduced signal.

4. A noise reduction device, comprising:

a high-pass filter to which input signals are provided;

a first sample and hold circuit to which an output from said high-pass filter is provided;

a synchronization signal generator generating sampling pulses driving said first sample and hold circuit and a sample and hold circuit of a video camera, the output of the sample and hold circuit of the video camera being input into said high pass filter, said generator generating sampling pulses of the same frequency to drive both sample and hold circuits;

an inversion circuit to which an output from said first sample and hold circuit is provided;

a limiter for limiting the amplitude of an output from said inversion circuit;

a second sample and hold circuit to which said input signals are provided; and an adder for adding an output of said second sample and hold circuit to an output of said limiter, and for outputting noise-reduced signals.

5. An image pickup device, comprising:

a first portion having (i) an image pickup element and (ii) a first sample and hold circuit to which an output from the image pickup element is provided; and a second portion having (i) an A/D converter to which a sample and hold output of said first sample and hold circuit is provided, (ii) a digital camera process circuit for signal processing digital data obtained from the A/D converter, (iii) a synchronization signal generator; and (iv) a noise reduction device, disposed anterior to said A/D converter, for reducing noise of said sample and hold output, said noise reduction device including: (a) a high-pass filter to which said sample and hold output is provided; (b) a second sample and hold circuit to which an output from said high-pass filter is provided;
(c) a limiter for limiting the amplitude of an output from said second sample and hold circuit; and (d) a differential amplifier for receiving said sample and hold output and an output from said limiter, and for outputting a noise-reduced signal, said synchronization signal generator generating sampling pulses of the same frequency driving said first and second sample and hold circuits.

6. An image pickup device, comprising:

a first portion having (i) an image pickup element and (ii) a first sample and hold circuit to an output from the image pickup element is provided; and a second portion having (i) an A/D converter to which a sample and hold output of said first sample and hold circuit is provided, (ii) a digital camera process circuit for signal processing digital data obtained from the A/D converter, (iii) a synchronization signal generator, and (iv) a noise reduction device, disposed anterior to said A/D converter, for reducing noise of said sample and hold output, said noise reduction device including: (a) a high-pass filter to which said sample and hold output is provided; (b) a second sample and hold circuit to which an output from said high-pass filter is provided; (c) an inversion circuit to which an output from said second sample and hold circuit is provided; (d) a limiter for limiting the amplitude of an output from said inversion circuit; and (e) an adder for adding said sample and hold output from said first sample and hold circuit to the output of said limiter, and for outputting a noise-reduced signal, said synchronization signal generator generating sampling pulses of the same frequency driving said first and second sample and hold circuits.

7. An image pickup device, comprising:

a first portion having (i) an image pickup element and (ii) a first sample and hold circuit to which an output from the image pickup element is provided; and a second portion having (i) an A/D converter to which a sample and hold output of said first sample and hold circuit is provided, (ii) a digital camera process circuit for signal processing digital data obtained from the A/D converter, and (iii) a synchronization signal generator, and (iv) a noise reduction device, disposed anterior to said A/D converter, for reducing noise of said sample and hold output, said noise reduction device including: (a) a high-pass filter to which said sample and hold output is provided; (b) a second sample and hold circuit to which an output from said high-pass filter is provided; (c) a limiter for limiting the amplitude of an output from said second sample and hold circuit; (d) a third sample and hold circuit to which said sample and hold output from said first sample and hold circuit is provided; and (e) a differential amplifier to which an output of said third sample and hold circuit and an output of said limiter are provided, and for outputting a noise-generated signal, said synchronization signal generator generating sampling pulses of the same frequency driving said first and second sample and hold circuits.

8. An image pickup device, comprising:

a first portion having (i) an image pickup element and (ii) a first sample and hold circuit to which an output from the image pickup element is provided; and a second portion having (i) an A/D converter to which a sample and hold output of said first sample and hold circuit is provided, (ii) a digital camera process circuit for signal processing digital data obtained from the A/D converter, and (iii) a synchronization signal generator, and (iv) a noise reduction device, disposed anterior to said A/D converter, for reducing noise of said sample and hold output, said noise reduction device including: (a) a high-pass filter to which said sample and hold output is provided; (b) a second sample and hold circuit to which an output from said high-pass filter is provided; (c) an inversion circuit to which an output from said second sample and hold circuit is provided; (d) a limiter for limiting the amplitude of an output from said inversion circuit; (e) a third sample and hold circuit to which said sample and hold output from said first sample and hold circuit is provided; and (f) an adder for adding the output of said third sample and hold circuit to an output of said limiter and for providing a noise-reduced signal, said synchronization signal generator generating sampling pulses of the same frequency driving said first and second sample and hold circuits.

9. A noise reduction device comprising:

a high-pass filter receiving input signals;

a sample-and-hold circuit receiving an output from the high-pass filter;

a synchronization signal generator generating sampling pulses driving said sample and hold circuit and a sample and hold circuit of a video camera, the output of the sample and hold circuit of the video camera being input into said high pass filter, said generator generating sampling pulses of the same frequency to drive both sample and hold circuits;

a limiter which receives an output from the sample-and-hold circuit of said noise reduction device and limits the amplitude thereof; and an operation circuit for receiving said input signals and an output from said limiter, and for inputting noise-reduced signals corresponding to said input signals.

10. An image signal processing apparatus for processing an image signal provided from an image pickup apparatus through a cable, said apparatus comprising:

a high-pass filter which receives input image signals from the image pickup apparatus through the cable;

a sample-and-hold circuit for sampling and holding an output from said high-pass filter;

a synchronization signal generator generating sampling pulses driving said sample and hold circuit and a sample and hold circuit of a video camera, the output of the sample and hold circuit of the video camera being input into said high pass filter, said generator generating sampling pulses of the same frequency to drive both sample and hold circuits;

a limiter for limiting the amplitude of an output from the sample-and-hold circuit of said image processing apparatus;

an operation circuit for receiving and processing said input image signals and an output from said limiter, and for outputting noise-reduced signals corresponding to said input signals;

an A/D converter for converting an output of said operation circuit into a digital signal; and a signal processing circuit for processing the digital signal converted by said A/D converter.

* * * * *

UNITED STATES PATENT AND TRADEMARK OFFICE
CERTIFICATE OF CORRECTION

PATENT NO. : 5,850,257

DATED : December 15, 1998

INVENTOR(S) : TSUGUHIDE SAKATA

It is certified that error appears in the above-identified patent and that said Letters Patent is hereby corrected as shown below:

COVER PAGE [56]
Foreign Patent Documents, "2/1928" should read --5/3 2/1994--; and "06029505" should read --6-029505--.

COLUMN 4,
Line 24, "achieve" should read --achieved--.

COLUMN 7,
Line 19, "16.0" should read --160--.

COLUMN 10,
Line 19, "AID" should read --A/D--.

Signed and Sealed this

Tenth Day of August, 1999

Attest:

Q. TODD DICKINSON

*Attesting Officer*   *Acting Commissioner of Patents and Trademarks*